Figure 1:
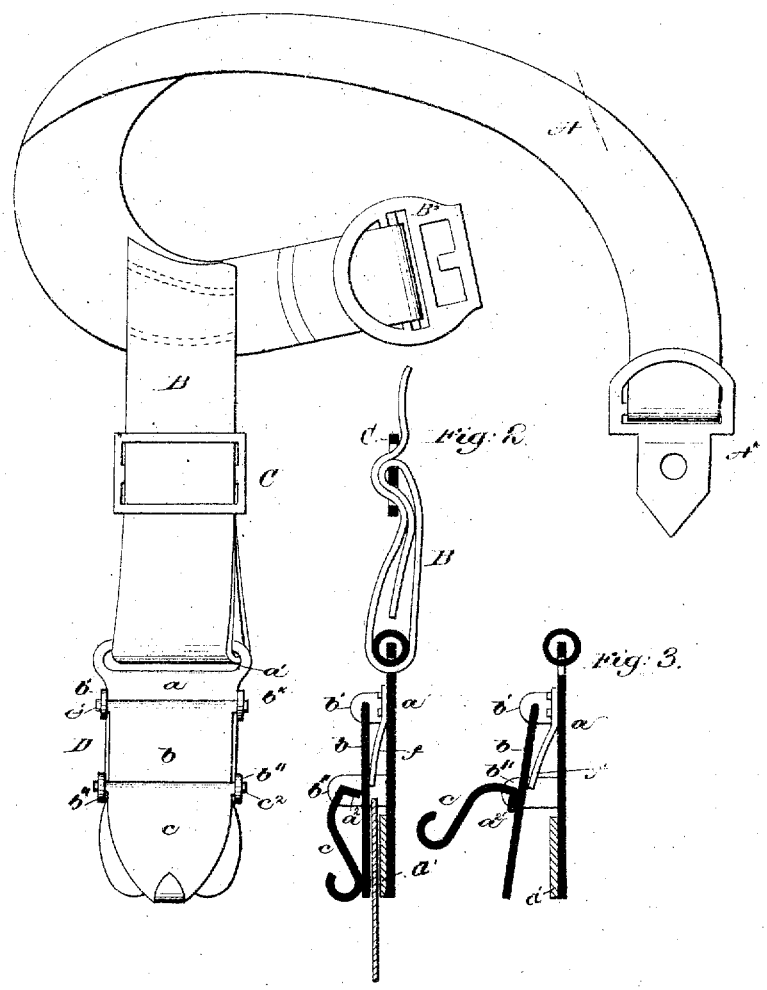

W. S. WARDWELL.

Assignor to G. FROST, G. H. PHELPS and G. A. FROST.

GARTER.

No. 10,783. Reissued Nov. 16, 1886.

Witnesses
Fred L. Emery
John F. C. Prinkert

Inventor
William S. Wardwell,
by Crosby & Gregory Attys.

UNITED STATES PATENT OFFICE.

WILLIAM S. WARDWELL, OF RUTLAND, VT., ASSIGNOR TO GEORGE FROST, GEORGE H. PHELPS, AND GEORGE A. FROST, OF WEST NEWTON, MASS.

GARTER.

SPECIFICATION forming part of Reissued Letters Patent No. 10,783, dated November 16, 1886.

Original No. 152,209, dated June 16, 1874. Reissue No. 9,143, dated April 6, 1880. Serial No. 208,222. Application for reissue filed July 16, 1886.

*To all whom it may concern:*

Be it known that I, WILLIAM S. WARDWELL, of Rutland, county of Rutland, and State of Vermont, have invented Improvements in Garters, of which the following description, in connection with the accompanying drawings, is a specification, like letters on the drawings representing like parts.

This invention is designed to furnish a simple, cheap, and efficient buckling device for suspending stockings in lieu of the ordinary garter, and for other analogous purposes.

It consists in certain novel combinations of parts whereby the desired result is effectually accomplished.

Figure 1 is a side view of a stocking-suspender made according to my invention. Fig. 2 is a longitudinal section of the buckle or clamp constituting a portion of the same, showing the parts in a closed position; and Fig. 3 is a similar view of the said buckle or clamp, showing the parts in an open position.

A is a band of elastic webbing designed to be passed around the leg, either above or below the knee, but at some little space above the top of the stocking, and there held by a tongue, A*, and buckle B*, provided upon its ends to join or unite the same. Attached to this band A, at any desired point, is the pendent elastic strap B, made adjustable as to its available length by having its lower portion looped in and through the clasp C, as more plainly represented in Fig. 2.

D is a clamp comprising a flat plate, *a*, through a slot, *a'*, in the upper part of which passes the looped lower part of the strap B, to attach the clamp to the said strap.

The plate *a* is provided with two sets, *b' b''*, of lugs or ears, situated at right angles to its inner face in such manner that the one set, *b'*, provides bearings for the pivots *e'* of a clamping-plate, *b*, while the other, *b''*, provides bearings for the pivots *c''* of a lever-plate, *c*, the inner edge, *a''*, of which is turned inward at an angle to its main length, as shown in Figs. 2 and 3, to exert a cam-like action upon the clamping-plate, as hereinafter fully set forth.

The pivots *c''* of the lever-plate and those, *e'*, of the clamping-plate are in each formed by lateral extensions from the edges of the said parts of the metal of which the same are made.

Attached in any suitable manner to the lower inner surface of the clamping-plate *a* is a thickness, *a'*, of india-rubber or equivalent elastic material. Fixed to the upper inner surface of said clamping-plate is a spring, *f*, which, pressing against the lever-plate *c*, tends to force the same outward to the open position shown in Fig. 3. The band A being placed upon the leg, as hereinbefore explained, the clamp D, open, as indicated in Fig. 3, is thrust downward to bring the upper edge of the stocking between the plate *a* and the clamping-plate *b*, which done, the lever-plate is forced downward and inward, thereby causing the turned edge *a''* to act after the manner of a cam to force the clamping-plate toward the plate *a*, thereby to forcibly clamp or retain the hereinbefore-mentioned part of the stocking between the clamping-plate and the plate *a*, until designedly released by turning the lever-plate outward to the position shown in Fig. 3, and allowing the spring *f* to automatically throw the clamping plate outward from the clamping-plate *a*.

It will be seen that the strap B, being pendent, elastic, and adjustable, enables the stocking to be held up without exerting undue strain either upon the stocking or upon the suspensory device itself, and without necessitating any injurious tightness upon the limb; also, that the layer of elastic material $a^2$, acting as a cushion, insures the gripping action of the clamp, whether, within certain limits, the fabric of the stocking be of greater or less thickness, and without injury in any event to such fabric; also, that the spring *f*, by automatically opening the clamp when the lever-plate is turned outward or upward, materially facilitates the application of the device to the uses for which it is designed.

The clamp may on occasion be applied to analogous suspensory devices—for example, to ordinary "suspenders," so termed, and also, when desired, to elastic straps pendent from a band placed about the waist and depending parallel with the limbs for connection with the stockings by means of the clamps.

I do not claim a band to encircle the leg, the said band having two pendent straps, one at each side the leg, to equally support a stocking.

I claim—

The combination of the band A, arranged to buckle around the leg immediately below the knee, and the strap B, pendent from the said band A at but one side thereof, as shown, and a clamping device attached to the said pendent strap B to grasp the stocking and hold up the same, substantially as and for the purpose herein set forth.

WILLIAM S. WARDWELL.

Witnesses:

G. W. GREGORY,

B. DEWAR.